Nov. 1, 1932. A. P. CROSBY 1,885,993
RADIATOR RETURN TRAP
Filed Nov. 2, 1931
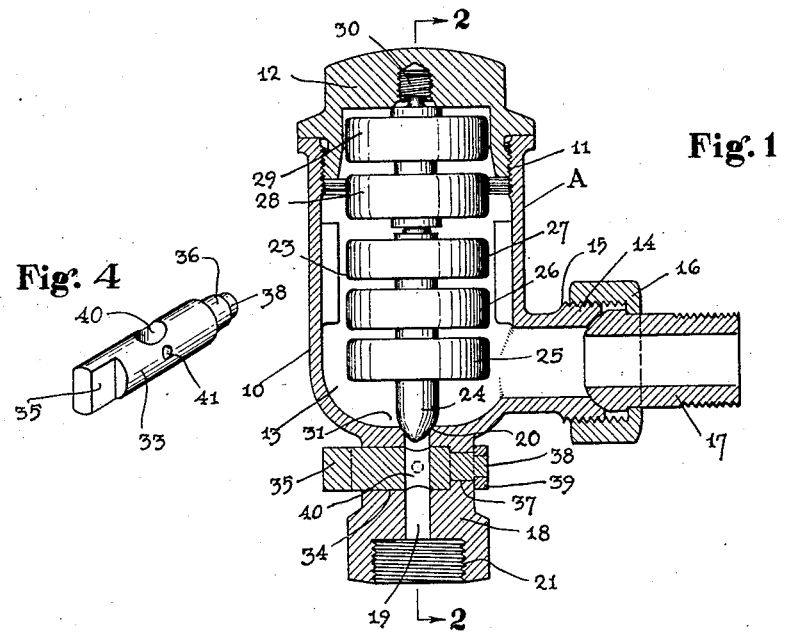
Fig. 1
Fig. 4
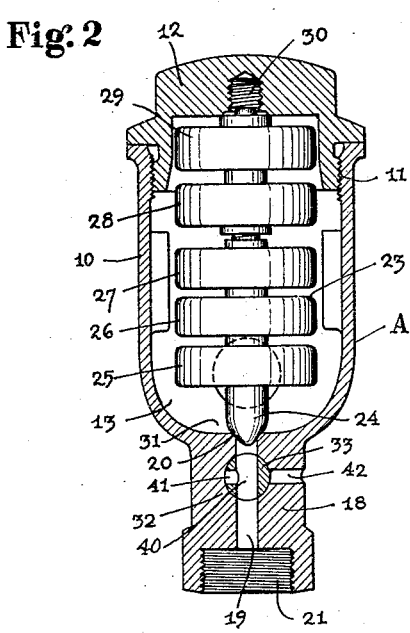
Fig. 2
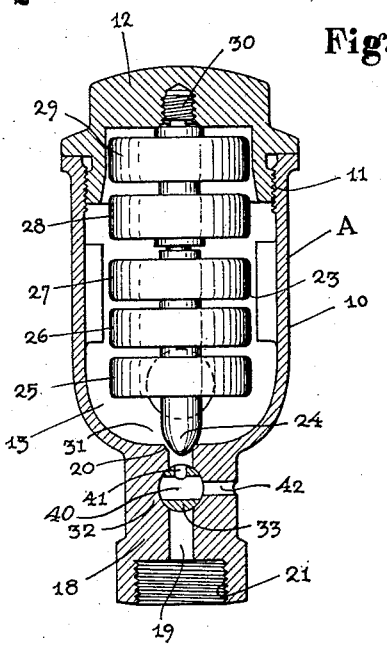
Fig. 3
Inventor
Arthur P. Crosby
By Caswell & Lagaard
Attorneys Patented Nov. 1, 1932

1,885,993

UNITED STATES PATENT OFFICE

ARTHUR P. CROSBY OF MINNEAPOLIS, MINNESOTA

RADIATOR RETURN TRAP

Application filed November 2, 1931. Serial No. 572,584.

My invention relates to radiator return traps and particularly to a device to be used in conjunction therewith for indicating the escape of steam past the valve mechanism thereof.

An object of the invention resides in providing a trap comprising a body formed with a chamber therein and having an inlet and an outlet communicating therewith and a valve seat formed in said body between the outlet and chamber therein, together with a temperature controlled valve member adapted to seat against said valve seat.

Another object of the invention resides in providing a bore within said body communicating with said outlet and chamber through said valve, and in providing steam indicating means adapted to communicate with said bore.

A still further object of the invention resides in providing an auxiliary valve operable to bring said steam indicating means into communication with said bore.

Another object of the invention resides in providing means operable in conjunction with said auxiliary valve for shutting off communication between said outlet and said chamber during the operation of said steam indicating means.

An object of the invention resides in employing a passageway adapted to communicate with said bore and controlled through said auxiliary valve.

A feature of the invention resides in constructing said passageway to form a steam nozzle for indicating the escape of steam through said return trap valve.

Other objects of the invention reside in the novel combination and arrangement of parts and in the details of construction hereinafter illustrated and/or described.

In the drawing:

Fig. 1 is an elevational sectional view taken through a radiator return trap illustrating an embodiment of my invention, and showing the trap in normal operation.

Fig. 2 is a sectional view taken on line 2—2 of Fig. 1 with the parts disposed in the same relation as shown in Fig. 1.

Fig. 3 is a view similar to Fig. 2 showing the auxiliary valve moved to bring the steam indicating means into operation.

Fig. 4 is a perspective view of the movable part of the auxiliary valve.

In ordinary heating systems and particularly vacuum systems where a large number of radiator return traps are employed, considerable difficulty has been encountered when loss of vacuum in the system occurred through leaking traps in ascertaining which of the traps was leaking. In such cases it became necessary to remove each trap from the installation before the defective valve could be discovered. The present invention provides a device in which the leaking valve may quickly be singled out and in which the amount of leakage may be roughly determined.

The radiator return trap, which I have illustrated in the drawing is indicated in its entirety at A and comprises a cylindrical body 10, open at the top and internally threaded at 11 to receive a cap or closure 12 therefor. This body is hollow to form a chamber 13 within the same. At one side of the body 10 is formed a pipe connection 14 providing an inlet into the chamber 13 of said body, which connection is externally threaded at 15 to receive a clamp nut 16 by means of which the entire trap may be rigidly mounted upon the usual nipple 17 of the radiator with which the trap is to be used.

The lower portion of the body 10 of the trap is constructed with a neck 18 having a bore 19 extending therethrough and communicating with the chamber 13 within the body 10. A valve indicated at 31 serves to control the flow of fluid between the chamber 13 and the bore 19 and is thermostatically controlled to exclude the passage of steam into said bore but to allow the flow of water therethrough. The lower end of the neck 18 is threaded as designated at 21 to form a pipe connection which may be connected to the return pipe of the heating system with which the trap is to be used.

The valve 31 includes a valve seat 20 which is formed in the body 10 at the upper end of the neck 18 and which encircles the bore 19. Within the body 10 is disposed a thermoresponsive element 23, which includes a valve member 24 adapted to seat against the seat 20. This thermo-responsive member may be constructed as shown in my Patent Number 1,694,641 issued December 11, 1928, and consists of a number of interconnected expansible members 25, 26, 27, 28, and 29, which are connected to a screw plug 30 adapted to be supported in the cap 12. The members 25, 26 and 27 may be filled with a volatile fluid and serve to open and close the valve 31 in accordance with the temperature in the chamber 13. The two members 28 and 29 may be filled with air or some other similar fluid which serves as a cushion to prevent injury to the thermo-responsive element 23 in the event of excess temperature within the trap. The particular type of thermoresponsive element shown has been selected merely for the purpose of illustration and it can be readily comprehended that the invention can be embodied in any suitable type of trap.

Between the valve 31 and the outlet from the trap, is provided an auxiliary valve indicated in its entirety at 32. This valve comprises a revoluble core 33 which is received within a transverse bore 34 intersecting the bore 19. The core 33 is provided at one end with a head 35 by means of which the same may be rotated, which is flattened as shown to permit of application of a wrench or handle thereto. The other end of this core is provided with a neck 36 slightly smaller in diameter than the body of said core, which is received within a corresponding portion 37 of the bore 34 which is similarly reduced in diameter. The extreme end of the neck 38 is further reduced in diameter as indicated at 38 to receive a washer 39 which holds the core axially immovable within the bore 34. The core 33 is provided intermediate the ends thereof with a transverse hole 40 extending completely therethrough and adapted to be brought into register with the bore 19 to afford a clear passageway from the chamber 13 and through the valve 31 to the outlet of the device. Another transverse hole 41 of slightly smaller dimensions than the hole 40 lies in the plane of the axis of the hole 40 and is disposed at right angles thereto extending through one side of the core structure and up to the hole 40. In the neck 18 of the trap proper is formed a transverse opening 42 which communicates with the two bores 34 and 19. The outer end of this opening serves as a steam nozzle as will presently be described and operates to direct the steam outwardly from the trap when the valve core 33 is turned in the proper direction. When the valve core 33 is positioned as shown in Figs. 1 and 2, the hole 41 lies along the wall of the neck 18 opposite the hole 42 and the hole 42 is closed through the core 33 to prevent the escape of fluid from the same. At the same time, the hole 40 is in alignment with the bore 19 so that the water collected within the trap may escape past the valve 31 and return to the boiler through the return pipe of the system. When the core 33 is turned at right angles to the position shown in Fig. 2 as illustrated in Fig. 3, the hole 41 is brought into register with the portion of the bore 19 above bore 34 and the hole 40 brought into communication with the trap through the valve 31. The hole 42 is so situated that when the valve core is shown in Fig. 3, said valve is also in communication with the hole 40. Any steam passing through the valve 31, when valve 32 is so positioned, will shoot out through the steam nozzle formed by the hole 42 and indicate leakage of steam past the valve 31.

The trap proper with which the invention is used, functions in the usual manner. When, however, the valve member 24 fails to seat against the valve seat 20 as indicated in Fig. 3, either by said valve member failing to function properly or through pitting of the valve seat or valve member, steam will immediately leak past the said valve and into the return pipe. This reduces the vacuum in the system when the trap is used in a vacuum system, causing the system to function improperly. As previously stated, the customary practice heretofore has been to remove each valve and test the same before the leaky trap could be determined. With a building equipped with traps constructed in accordance with my invention, it is merely necessary, in order to determine the leaky trap, to turn the various valve cores 33 thereof in a direction as indicated in Fig. 3. If drops of water leak out slowly through the steam nozzle, the valve is functioning properly and the valve core 33 may be turned to assume the normal position such as shown in Fig. 2. If, however, steam flows out through the opening or steam nozzle 42, leakage is indicated and the particular trap may be removed from the system and another replaced. The trap may then be repaired and tested and if desired may be replaced back in the system.

In the examination of the various traps, the amount of leakage can also be determined by the amount of steam discharged from the nozzle 42. For this reason the nozzle 42 is constructed considerably smaller than the bore 19 so that the steam is directed outwardly therefrom with sufficient force to indicate the quantity of steam passing from the trap.

Although I have shown my trap as constructed with a particular type of valve operating device, it can readily be understood that the trap may be constructed in any suitable manner and be operated through any suitable means, such as now well known in the art.

The advantages of my invention are manifest. Considerable economy in operating expense results in that leaky traps may be quickly singled out without the necessity of removing the trap from the heating system. In the testing of the traps, the return system is cut off from the traps so that loss of vacuum in the system is prevented while the traps are being tested. The device is exceedingly simple and is positive in action. When the auxiliary valve core is turned in the proper direction, the trap functions in identically the same manner as the same would ordinarily function. My improved trap can be constructed at a cost hardly exceeding that of the ordinary trap. The auxiliary valve may be so positioned as to be readily accessible and does not appreciably change the appearance of the trap.

Changes in the specific form of my invention as herein disclosed may be made within the scope of what is claimed, without departing from the spirit of my invention.

Having described my invention, what I claim as new and desire to protect by Letters Patent is:

1. A radiator return trap comprising a body formed with a chamber therein and having an inlet and an outlet communicating therewith, a valve in said housing for closing communication between said outlet and chamber, temperature controlled means for closing said valve, a steam nozzle, an auxiliary valve for bringing said steam nozzle in communication with said chamber through said first named valve and means operated by said valve for closing communication between said outlet and said chamber.

2. A radiator return trap comprising a body formed with a chamber therein and having an inlet and an outlet communicating therewith, a valve in said housing for closing communication between said outlet and chamber, temperature controlled means for closing said valve, a steam nozzle, an auxiliary valve for bringing said steam nozzle in communication with said chamber through said first named nozzle and means simultaneously operable with said auxiliary valve to close communication between said outlet and said chamber upon bringing of the steam nozzle into communication with said chamber.

3. In combination with the drain pipe of a radiator and the return pipe of a heating system, a return trap including a valve disposed between said drain pipe and return pipe for returning water from the radiator to said return pipe, steam indicating means disposed on the return side of said valve, an auxiliary valve for bringing the trap into communication with said steam indicating means through the valve in the trap and means for cutting off communication between the trap and the return pipe during operation of said steam indicating means.

In testimony whereof I affix my signature.

ARTHUR P. CROSBY.